US007673799B2

(12) United States Patent  (10) Patent No.: US 7,673,799 B2
Hart et al.  (45) Date of Patent: Mar. 9, 2010

(54) CARD READER FOR USE WITH WEB BASED TRANSACTIONS

(75) Inventors: Annmarie D. Hart, Carson, CA (US); Terrence R. Benson, Redondo Beach, CA (US); Lawrence R. Meyers, Rancho Palos Verdes, CA (US)

(73) Assignee: MagTek, Inc., Seal Beach, CA (US)

( * ) Notice: Subject to any disclaimer, the term of this patent is extended or adjusted under 35 U.S.C. 154(b) by 0 days.

(21) Appl. No.: 12/011,301

(22) Filed: Jan. 25, 2008

(65) Prior Publication Data

US 2008/0179401 A1    Jul. 31, 2008

Related U.S. Application Data

(60) Provisional application No. 60/886,810, filed on Jan. 26, 2007.

(51) Int. Cl.
*G06K 7/08* (2006.01)
(52) U.S. Cl. .......................... 235/449; 713/169; 726/12
(58) Field of Classification Search .................. 235/449
See application file for complete search history.

(56) References Cited

U.S. PATENT DOCUMENTS

| 4,423,415 A | 12/1983 | Goldman |
| 4,476,468 A | 10/1984 | Goldman |
| 4,489,318 A | 12/1984 | Goldman |
| 4,546,352 A | 10/1985 | Goldman |
| 4,568,936 A | 2/1986 | Goldman |
| 4,630,845 A | 12/1986 | Sanner |
| 4,635,054 A | 1/1987 | Goldman |
| 4,650,978 A | 3/1987 | Hudson et al. |
| 4,689,477 A | 8/1987 | Goldman |
| 4,748,679 A | 5/1988 | Gold et al. |
| 4,752,837 A | 6/1988 | DeLand, Jr. |
| 4,785,290 A | 11/1988 | Goldman |
| 4,806,740 A | 2/1989 | Gold et al. |
| 4,807,287 A | 2/1989 | Tucker et al. |

(Continued)

OTHER PUBLICATIONS

International Search Report for Application No. PCT/US08/01013 filed Jan. 25, 2008, dated Jun. 5, 2008, mailed Jun. 25, 2008, 2 pages.

(Continued)

*Primary Examiner*—Michael G Lee
*Assistant Examiner*—Tabitha Chedekel
(74) *Attorney, Agent, or Firm*—Christie, Parker & Hale, LLP.

(57) ABSTRACT

A card reader for use in web based transactions is provided. In one embodiment, the invention relates to a method for establishing a secure connection between a card reader and a server, the method including receiving a first challenge request, generating a response to the first challenge request using a first encryption key, sending the response to the first challenge request, sending a second challenge request, receiving an encrypted response to the second challenge request, verifying the encrypted response to the second challenge request; and, if the encrypted response is verified, reading data card information from a data card, the data card information including an intrinsic magnetic characteristic and recorded data on the data card, generating a magnetic fingerprint based on the intrinsic magnetic characteristic, and sending the magnetic fingerprint to authenticate the data card.

38 Claims, 13 Drawing Sheets

U.S. PATENT DOCUMENTS

| | | | |
|---|---|---|---|
| 4,812,903 A | 3/1989 | Wagensonner et al. | |
| 4,837,426 A | 6/1989 | Pease et al. | |
| 4,906,988 A | 3/1990 | Copella | |
| 4,916,294 A | 4/1990 | Goldman | |
| 4,985,614 A | 1/1991 | Pease et al. | |
| 5,023,923 A | 6/1991 | Sanner et al. | |
| 5,177,344 A | 1/1993 | Pease | |
| 5,216,229 A | 6/1993 | Copella et al. | |
| 5,235,166 A | 8/1993 | Fernadez | |
| 5,254,843 A | 10/1993 | Hynes et al. | |
| 5,365,586 A | 11/1994 | Indeck et al. | |
| 5,396,369 A | 3/1995 | Deland, Jr. et al. | |
| 5,408,505 A | 4/1995 | Indeck et al. | |
| 5,428,683 A | 6/1995 | Indeck et al. | |
| 5,430,279 A | 7/1995 | Fernadez | |
| 5,434,917 A | 7/1995 | Naccache et al. | |
| 5,524,072 A | 6/1996 | Labaton et al. | |
| 5,546,462 A | 8/1996 | Indeck et al. | |
| 5,587,654 A | 12/1996 | Indeck et al. | |
| 5,602,381 A | 2/1997 | Hoshino et al. | |
| 5,612,528 A | 3/1997 | Green et al. | |
| 5,616,904 A | 4/1997 | Fernadez | |
| 5,625,689 A | 4/1997 | Indeck et al. | |
| 5,627,357 A | 5/1997 | Cheng et al. | |
| 5,646,621 A | 7/1997 | Cabler et al. | |
| 5,647,003 A | 7/1997 | Pease | |
| RE35,599 E | 9/1997 | Pease | |
| 5,729,230 A | 3/1998 | Jensen et al. | |
| 5,739,517 A | 4/1998 | Hoshino et al. | |
| 5,740,244 A | 4/1998 | Indeck et al. | |
| 5,767,495 A | 6/1998 | DeLand, Jr. | |
| 5,829,743 A | 11/1998 | DeLand, Jr. et al. | |
| 5,838,270 A | 11/1998 | Kiriaki | |
| 5,920,628 A | 7/1999 | Indeck et al. | |
| 5,988,500 A | 11/1999 | Litman | |
| 6,053,406 A | 4/2000 | Litman | |
| 6,075,860 A * | 6/2000 | Ketcham | 713/159 |
| 6,098,881 A | 8/2000 | DeLand, Jr. et al. | |
| 6,400,302 B1 | 6/2002 | Amazeen et al. | |
| 6,431,445 B1 | 8/2002 | DeLand, Jr. et al. | |
| 6,470,240 B1 | 10/2002 | Haynes et al. | |
| 6,476,743 B1 | 11/2002 | Brown et al. | |
| 6,535,561 B2 | 3/2003 | Boesch et al. | |
| 6,760,841 B1 * | 7/2004 | Fernandez | 713/172 |
| 6,830,182 B2 | 12/2004 | Izuyama | |
| 6,899,269 B1 | 5/2005 | Deland | |
| 7,051,002 B2 | 5/2006 | Keresman, III et al. | |
| 7,064,538 B2 | 6/2006 | Kernhof | |
| 7,090,130 B2 | 8/2006 | DeLand, Jr. et al. | |
| 7,210,627 B2 | 5/2007 | Morley, Jr. et al. | |
| 2002/0038286 A1 * | 3/2002 | Koren et al. | 705/40 |
| 2003/0191711 A1 * | 10/2003 | Jamison et al. | 705/40 |
| 2005/0165695 A1 | 7/2005 | Berardi et al. | |
| 2005/0167495 A1 * | 8/2005 | Morley et al. | 235/449 |
| 2005/0173530 A1 | 8/2005 | DeLand, Jr. et al. | |
| 2005/0210247 A1 * | 9/2005 | Ong et al. | 713/168 |
| 2005/0218229 A1 | 10/2005 | Morley, Jr. et al. | |
| 2006/0059073 A1 | 3/2006 | Walzak | |
| 2006/0210076 A1 | 9/2006 | Knighton et al. | |
| 2007/0006150 A9 | 1/2007 | Walmsley | |
| 2008/0040276 A1 * | 2/2008 | Hammad et al. | 705/44 |

OTHER PUBLICATIONS

Written Opinion for Application No. PCT/US08/01013 filed Jan. 25, 2008, dated Jun. 5, 2008, mailed Jun. 25, 2008, 5 pages.

Paul Johnston, "Authentication and Session Management on the Web", SANS Institutue 2005, Nov. 28, 2004, pp. 1-31.

International Search Report for Application No. PCT/US05/046387 filed Dec. 19, 2005, dated Sep. 28, 2006, mailed Oct. 20, 2006, 3 page.

Written Opinion for Application No. PCT/US05/046387 filed Dec. 19, 2005, dated Sep. 28, 2006, mailed Oct. 20, 2006, 3 pages.

International Search Report for Application No. PCT/US05/046388 filed Dec. 19, 2005, dated Aug. 14, 2006, mailed Oct. 17, 2006, 3 pages.

Written Opinion for Application No. PCT/US05/046388 filed Dec. 19, 2005, dated Aug. 14, 2006, mailed Oct. 17, 2006, 3 pages.

International Search Report for Application No. PCT/US05/046389 filed Dec. 19, 2005, dated Novebmer 13, 2006, mailed Dec. 5, 2006, 3 page.

Written Opinion for Application No. PCT/US05/046389 filed Dec. 19, 2005, dated Nov. 13, 2006, mailed Dec. 5, 2006, 3 page.

International Search Report for Application No. PCT/US07/83842 filed Nov. 6, 2007, dated Apr. 11, 2008, mailed May 1, 2008, 2 pages.

Written Opinion for Application No. PCT/US07/83842 filed Nov. 6, 2007, dated Apr. 10, 2008, mailed May 1, 2008, 6 pages.

International Search Report for Application No. PCT/US07/60586 filed Jan. 16, 2007, dated Sep. 12, 2008, mailed Sep. 19, 2008, 3 pages.

Written Opinion for Application No. PCT/US07/60586 filed Jan. 16, 2007, dated Sep. 12, 2008, mailed Sep. 19, 2008, 3 pages.

* cited by examiner

CARD READER FOR USE WITH WEB BASED TRANSACTIONS

CROSS REFERENCE TO RELATED APPLICATIONS

The present application claims the benefit of Provisional Application No. 60/886,810, filed Jan. 26, 2007, entitled "CARD READER FOR USE IN WEB BASED TRANSACTIONS", the contents of which are expressly incorporated herein by reference in their entirety.

BACKGROUND TO THE INVENTION

The present invention relates generally to magnetic stripe card readers and more specifically to magnetic stripe card readers that encrypt information extracted from a magnetic stripe.

Documents bearing magnetic stripes, such as magnetic stripe cards, are commonly used in a variety of transactions. In many instances data read from the magnetic stripe can be provided to a server to verify that the document bearing the magnetic stripe is authentic.

A number of different approaches are known for authenticating a document bearing a magnetic stripe. One approach is to extract data stored on the magnetic stripe and verify the authenticity of the data. Another approach that can foil attempts to reproduce information recorded on a magnetic stripe is to extract data concerning the physical characteristics of the magnetic stripe itself. Observations of the materials used to construct magnetic stripes have revealed that each material is unique and generates magnetic field with unique characteristics that are observable. When a signal is generated that is indicative of the magnetic field, the component of the signal that is indicative of this unique characteristic is often referred to as the remanent noise signal of the material. A number of authentication processes compare information concerning the remanent noise signal of a magnetic stripe on the document presented with known information concerning the remanent noise characteristic of the magnetic stripe of the authentic document. Correlation between the information suggests that the document presented is in fact authentic. Processes that seek to extract information that is unique to a particular magnetic stripe or data recorded on a magnetic stripe are commonly referred to as 'Magnetic Fingerprinting' techniques.

SUMMARY OF THE INVENTION

The invention relates to a card reader for use in web based transactions. In one embodiment, the invention relates to a method for establishing a secure connection between a card reader and a server, the method including receiving a first challenge request, generating a response to the first challenge request using a first encryption key, sending the response to the first challenge request, sending a second challenge request, receiving an encrypted response to the second challenge request, verifying the encrypted response to the second challenge request; and, if the encrypted response is verified, reading data card information from a data card, the data card information including an intrinsic magnetic characteristic and recorded data on the data card, generating a magnetic fingerprint based on the intrinsic magnetic characteristic, and sending the magnetic fingerprint to authenticate the data card.

In another embodiment, the invention relates to a system for establishing a secure connection between a card reader and a server, the system including, the card reader including a read head configured to read data card information from a data card, the data card information including an intrinsic magnetic characteristic and recorded data on the data card, and a processor coupled to the read head, the processor configured to receive a first challenge request, generate a response to the first challenge request using a first encryption key, send the response to the first challenge request, send a second challenge request, receive an encrypted response to the second challenge request, verify the encrypted response to the second challenge request, generate a magnetic fingerprint based on the intrinsic magnetic characteristic, and send the magnetic fingerprint.

In another embodiment, the invention relates to a method for establishing a secure connection between a card reader and a server, the method including receiving a challenge request, decrypting the challenge request using a first encryption key, generating a response to the challenge request using a second encryption key, sending the response to the challenge request, receiving an encrypted magnetic fingerprint, decrypting the encrypted magnetic fingerprint, generating a score indicative of a degree of correlation between the magnetic fingerprint and a reference magnetic fingerprint, and sending the score.

DETAILED DESCRIPTION OF THE INVENTION

Turning now to the drawings, embodiments of the present invention that include a magnetic stripe reader that is connected to a terminal are shown. The magnetic stripe reader extracts information from magnetic stripes on documents, encrypts some of the extracted information and provides at least some of the unencrypted information and some of the encrypted information to the terminal. In one aspect of the invention, the terminal can display some unencrypted information so that a terminal operator can identify any discrepancies between information on the document that is visually apparent and information contained on the magnetic stripe of the document. In another aspect of the invention, the terminal provides the unencrypted and the encrypted information received from the magnetic stripe reader to a host system or server. In many embodiments, the data terminal provides the information to the server via a network. In a number of embodiments, the reader is constructed with a tamper resistant housing and can identify itself with an encrypted and/or unencrypted serial number. Several embodiments also include USB ports to enable the connection of the reader between a keyboard and a computer. Embodiments that are interposed between a keyboard and a computer can enable the selective encryption of the output of the keyboard. By encrypting the output, an unsecured keyboard can provide encrypted PINs to the computing device for use in financial transactions.

In another aspect of the invention, the magnetic stripe reader and a server can engage in a challenge response mutual authentication process that verifies the authenticity of both the magnetic stripe reader and the server so that secure communications can be executed. Once the authenticity of the server has been established, the magnetic stripe reader can indicate to the user of the reader using a visible, audible or tactile indicator that the server is authentic. In some embodiments, the server is a website server. In several embodiments, the indicator is positioned on the housing of the magnetic stripe reader. In one embodiment, the indicator is a light emitting diode (LED).

Figure 1:
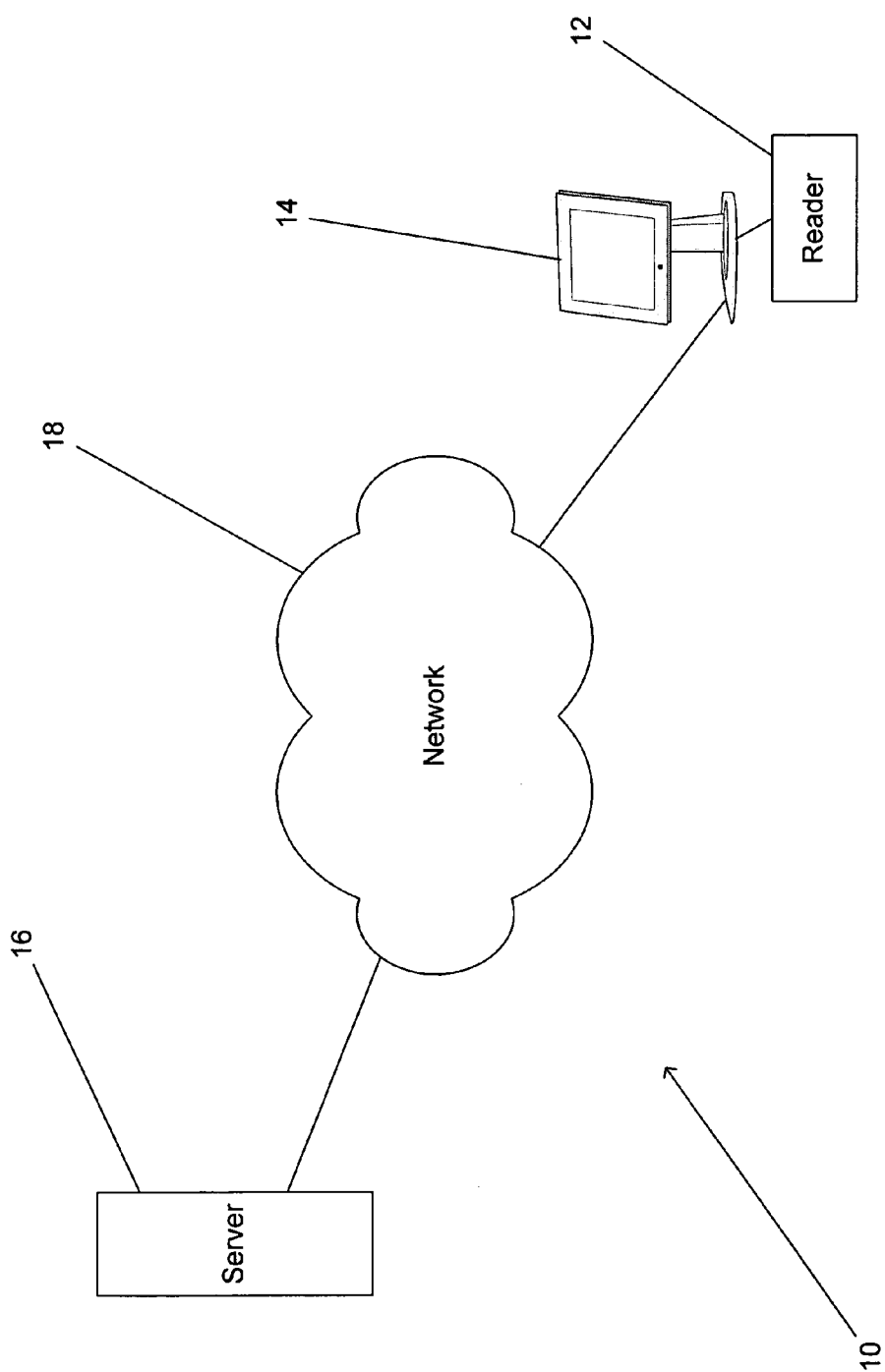
FIG. 1 schematic diagram of a transaction system in accordance with an embodiment of the present invention.

A network in accordance with an embodiment of the present invention is shown in FIG. 1. The network 10 includes a magnetic stripe card reader 12 that is connected to a terminal 14. The terminal is connected to a server 16 via a network 18.

In many embodiments, the magnetic stripe card reader 12 is configured to read magnetic stripes on documents such as credit cards. When a credit card is presented to the magnetic stripe card reader that complies with ISO Standard 7810/7811, the magnetic stripe card reader 12 can extract information from tracks 1, 2 and/or 3 of the magnetic stripe card. Tracks 1, 2 and 3 commonly include information such as an account number, the name of the account holder and the expiration date of the card. In addition to extracting recorded data, the magnetic stripe card reader can also extract a magnetic fingerprint of the magnetic stripe. In many embodiments, techniques such as those described in U.S. Pat. No. 6,098,881 to Deland, Jr., et al., U.S. Pat. No. 7,210,627 to Morley, Jr., et al. and U.S. patent application Ser. Nos. 11/014,930 and 11/015,271 which are hereby incorporated by reference in their entirety, can be used to extract a magnetic fingerprint of a magnetic stripe.

Once the magnetic stripe card reader 12 has extracted information from a magnetic stripe, the magnetic stripe card reader is configured to encrypt a portion of the extracted data. In many embodiments, the extracted data includes an account number, name and expiration date, which the magnetic stripe card reader can partially encrypt. In a number of embodiments, a sufficient portion of the extracted data is left unencrypted so that a comparison can be performed between the unencrypted information and information displayed visually on the document. In some embodiments, a sufficient portion, an unmasked portion, of an unencrypted account number is provided by the reader such that a comparison can be performed between the portion of the account number and information visually displayed on a document. In such case, the reader can provide an account number having both a masked portion and an unmasked portion. In some embodiments, the masked portion consists of a number of digits of the account number where the digits have been replaced by one or more masking digits. In one embodiment, the masking digit is an asterisk. In another embodiment, masking digits are selected according to the Luhn algorithm, or "mod 10" algorithm, described in U.S. Pat. No. 2,950,048. In one such case, the terminal knows which digits are masked and which digits are unmasked and only considers the unmasked digits for the purposes of comparison. The masked digits can be zeros and/or additional calculated digits arranged within the masked portion to allow the entire account number to pass a validation check based on the Luhn algorithm.

In addition to information extracted from the magnetic stripe card, the magnetic stripe card reader 12 can also encrypt at least a portion of information (such as a serial number) that uniquely identifies the magnetic stripe card reader and/or the magnetic reading head used to capture the information. The serial number can then be used to authenticate the reader to the server independently of the process used for authentication of a data card.

The magnetic stripe card reader 12 is also configured to provide the unencrypted and encrypted information to a terminal. As discussed above, the unencrypted information can be compared to information that is visually apparent on the document. Typically, a terminal will include a display device and the unencrypted information can be displayed on the display device so that a terminal operator can perform a comparison between the unencrypted information and information visually apparent on the card. In many embodiments, the unencrypted information is displayed in conjunction with meaningless characters (such as 'X') that denote a character that has been encrypted and, therefore, is not available for display by the terminal. In the event that the information does not correspond, then the terminal operator can cancel the transaction. In the absence of an interruption by a terminal operator, both the unencrypted and encrypted information are provided to the server 16 via the network 18. In addition to transmitting the unencrypted and encrypted information provided by the magnetic stripe card reader 12, the terminal can also transmit information that uniquely identifies the terminal. The terminal identification information can be encrypted or unencrypted.

In many embodiments, the server 16 includes a database of information concerning valid documents bearing magnetic stripes. In order to ascertain whether the information received from a terminal is associated with a valid document, the server 18 can decrypt the encrypted information and combine the decrypted information with the unencrypted information transmitted by the terminal. The combined information can then be compared against the records maintained in the database and a determination made concerning the authenticity of the document from which the information was extracted. The determination with respect to authenticity is transmitted to the terminal via the network and the determination used by the terminal in deciding whether to proceed with the transaction.

In many embodiments, a public key/private key encryption scheme is used by the magnetic stripe card reader 12. In a number of embodiments, each magnetic stripe card reader possesses a unique encryption key and in several embodiments, the server can change the encryption key. In a number of embodiments an encryption scheme complying with a standard commonly used by the financial industry such as Triple Data Encryption Standard (Triple DES) developed by International Business Machines Corporation of Armonk, N.Y. can be used. Many such embodiments derive a different encryption key for each transaction (commonly referred to by the acronym 'DUKPT', which stands for Derived Unique Key Per Transaction and is specified as ANSI X9.24). In other embodiments, other encryption techniques can be used.

Figure 2:
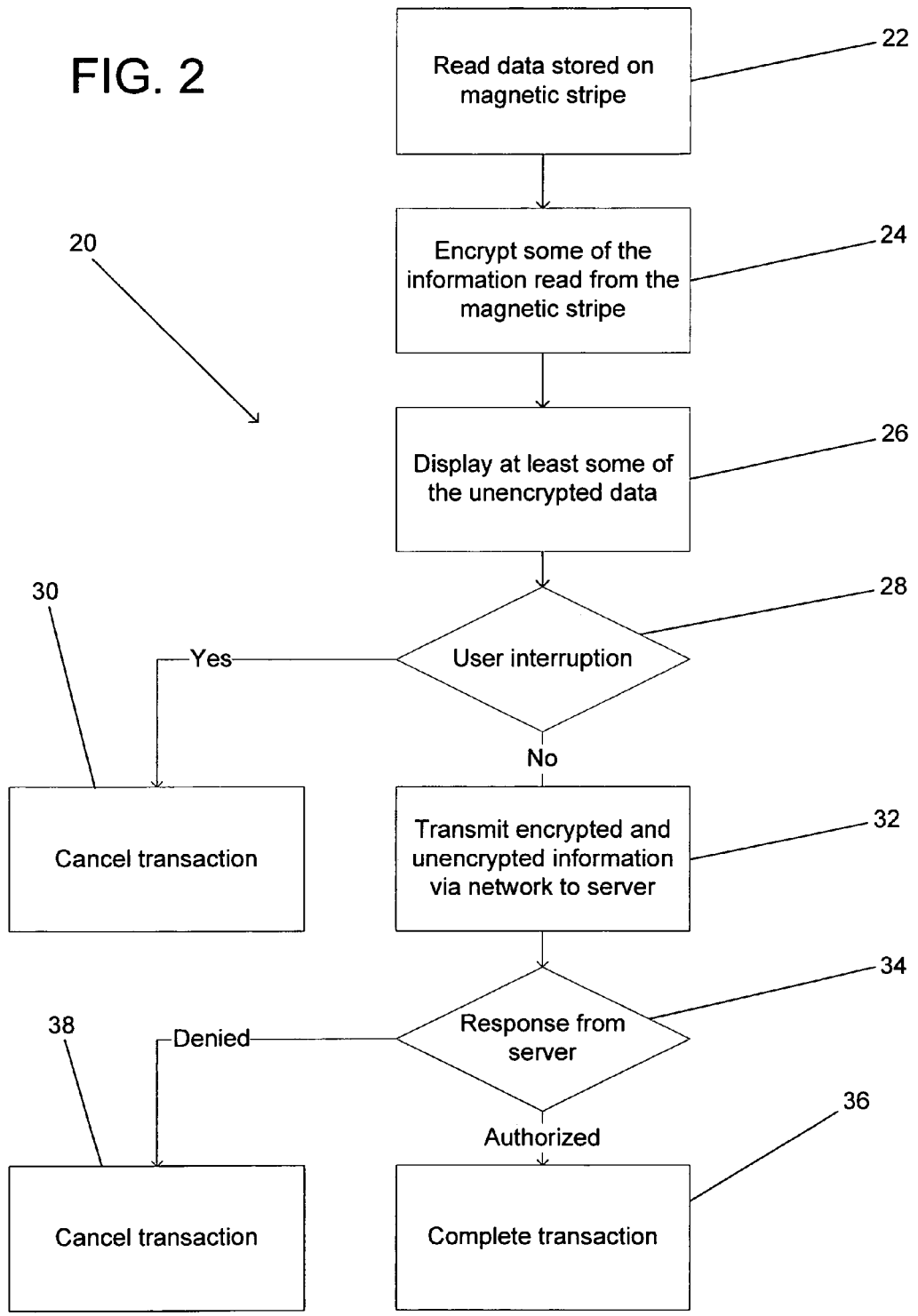
FIG. 2 is a flow chart showing a process in accordance with an embodiment of the present invention that can be performed by a terminal and a magnetic stripe card reader.

A process in accordance with the present invention that can be performed by a magnetic stripe card reader and terminal is shown in FIG. 2. The process 20 includes reading (22) data from the magnetic tracks of a magnetic stripe located on a document. Some of the data is then encrypted (24) and then at least some of the unencrypted data is displayed (26). In the event that a user interruption occurs (28), then the transaction is cancelled (30). Otherwise, at least some of the unencrypted data and at least some of the encrypted data are transmitted (32) to a server. A response is received (34) from the server. If the server's response indicates that the document bearing the magnetic stripe is authentic, then the transaction is processed (36). Otherwise, the transaction is cancelled (38). In several embodiments, methods are used that include several of the operations shown in FIG. 2 and/or perform the operations in different sequences.

Figure 3:
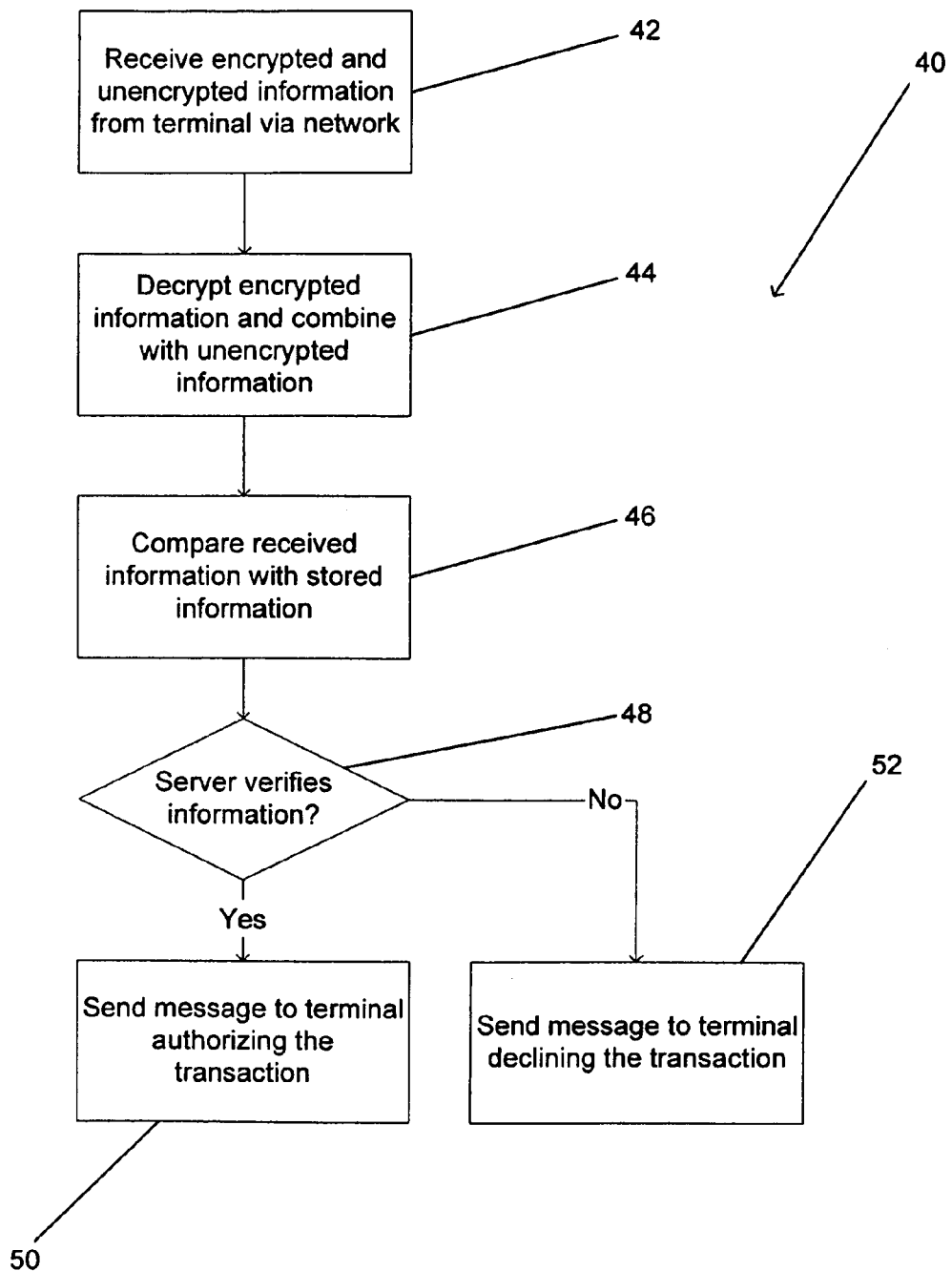
FIG. 3 is a flow chart showing a process in accordance with an embodiment of the present invention that can be performed by a server.

A process in accordance with the present invention that can be performed by a server is shown in FIG. 3. The process 40 commences when unencrypted and encrypted information is received (42) from a terminal. The encrypted information is decrypted (44) and then combined with the unencrypted information. The combined decrypted and unencrypted information is then compared (46) against stored information. A determination is then made (48) concerning whether the stored information verifies the authenticity of the document bearing the magnetic stripe from which the decrypted and unencrypted information was obtained. If the authenticity of the document is verified, then a message can be sent (50) to the terminal indicating that the document is authentic. Otherwise, a message can be sent (52) to the terminal indicating that the attempt to authenticate the document was unsuccessful. In several embodiments, methods are used that include several of the operations shown in FIG. 3 and/or perform the operations in different sequences.

Figure 4:
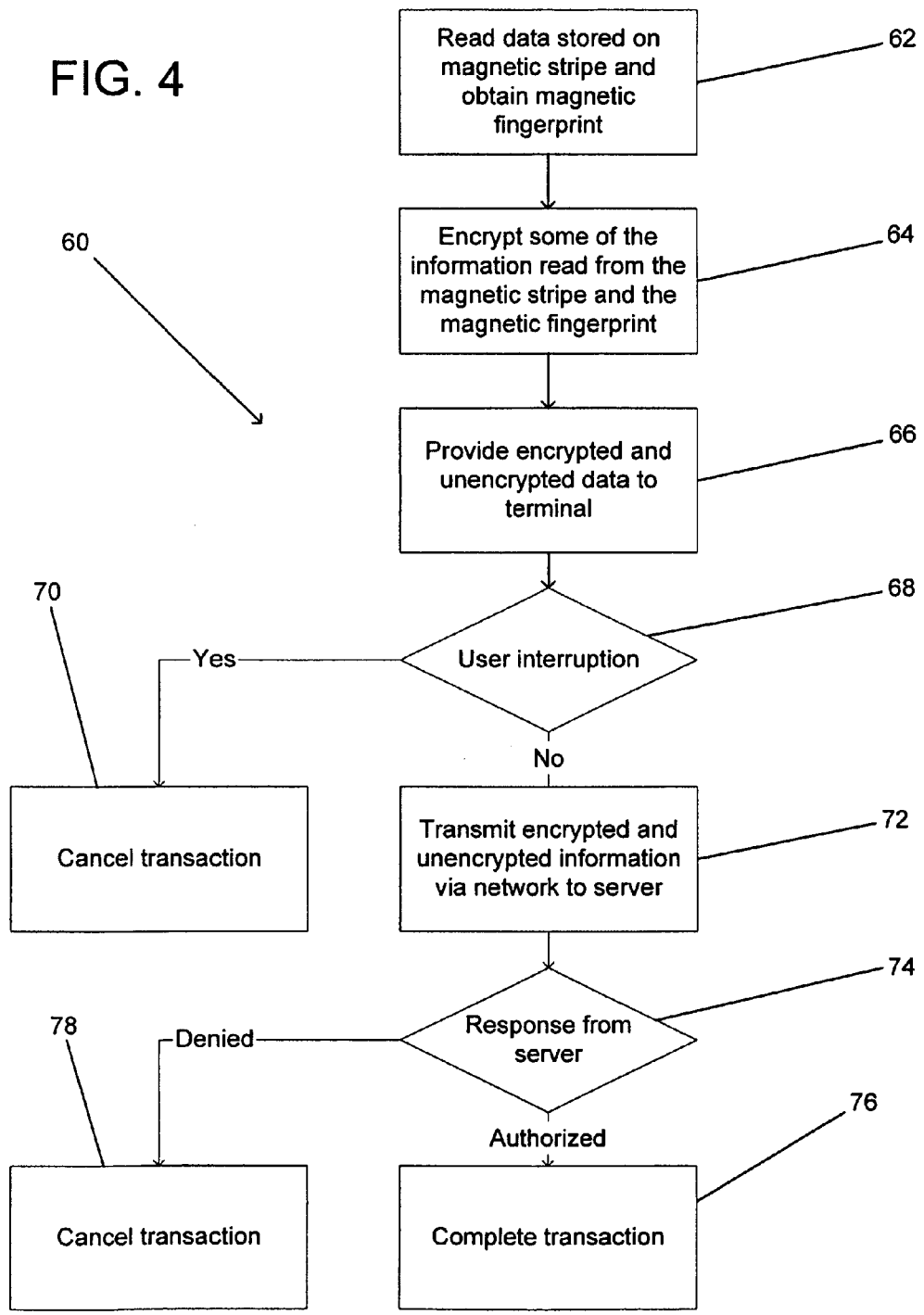
FIG. 4 is a flow chart showing a process in accordance with another embodiment of the present invention that can be performed by a terminal and a magnetic stripe card reader.

A process that can be implemented by a magnetic stripe card reader and a terminal for verifying the authenticity of a document bearing a magnetic stripe is shown in FIG. 4. The process 60 is similar to the process 20 shown in FIG. 2 with the addition that a magnetic fingerprint is extracted (62) from the magnetic stripe in addition to data. The magnetic fingerprint is also at least partially encrypted (64) and is provided (66) to the terminal for transmission (72) with the unencrypted and encrypted data extracted from the magnetic stripe that is sent to the server.

Figure 5:
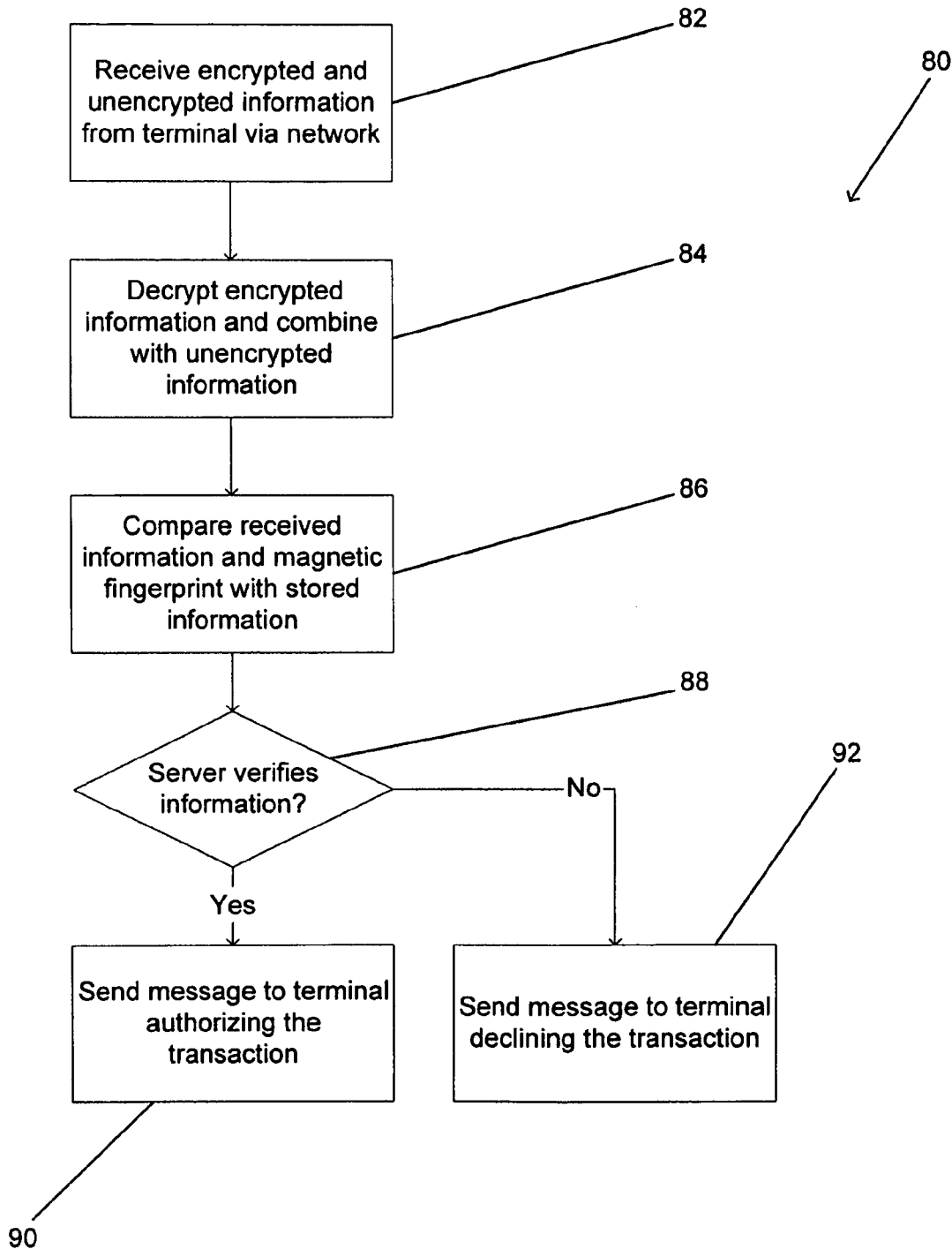
FIG. 5 is a flow chart showing a process in accordance with another embodiment of the present invention that can be performed by a server.

A process that can be implemented by a server in accordance with the present invention for determining the authenticity of a document based upon unencrypted and encrypted information extracted from a magnetic stripe on the document is shown in FIG. 5. The process 80 is similar to the process 40 shown in FIG. 3 with the addition that comparison of the unencrypted and decrypted information with the stored information involves determining the correspondence between an extracted magnetic fingerprint and at least one copy of the magnetic fingerprint that is maintained at a server. A variety of techniques are known for comparing magnetic fingerprints to determine authenticity including those described in U.S. Pat. No. 6,098,881 to Deland, Jr., et al., U.S. Pat. No. 7,210,627 to Morley, Jr., et al. and U.S. patent application Ser. Nos. 11/014,930 and 11/015,271, which is incorporated above.

Figure 6:
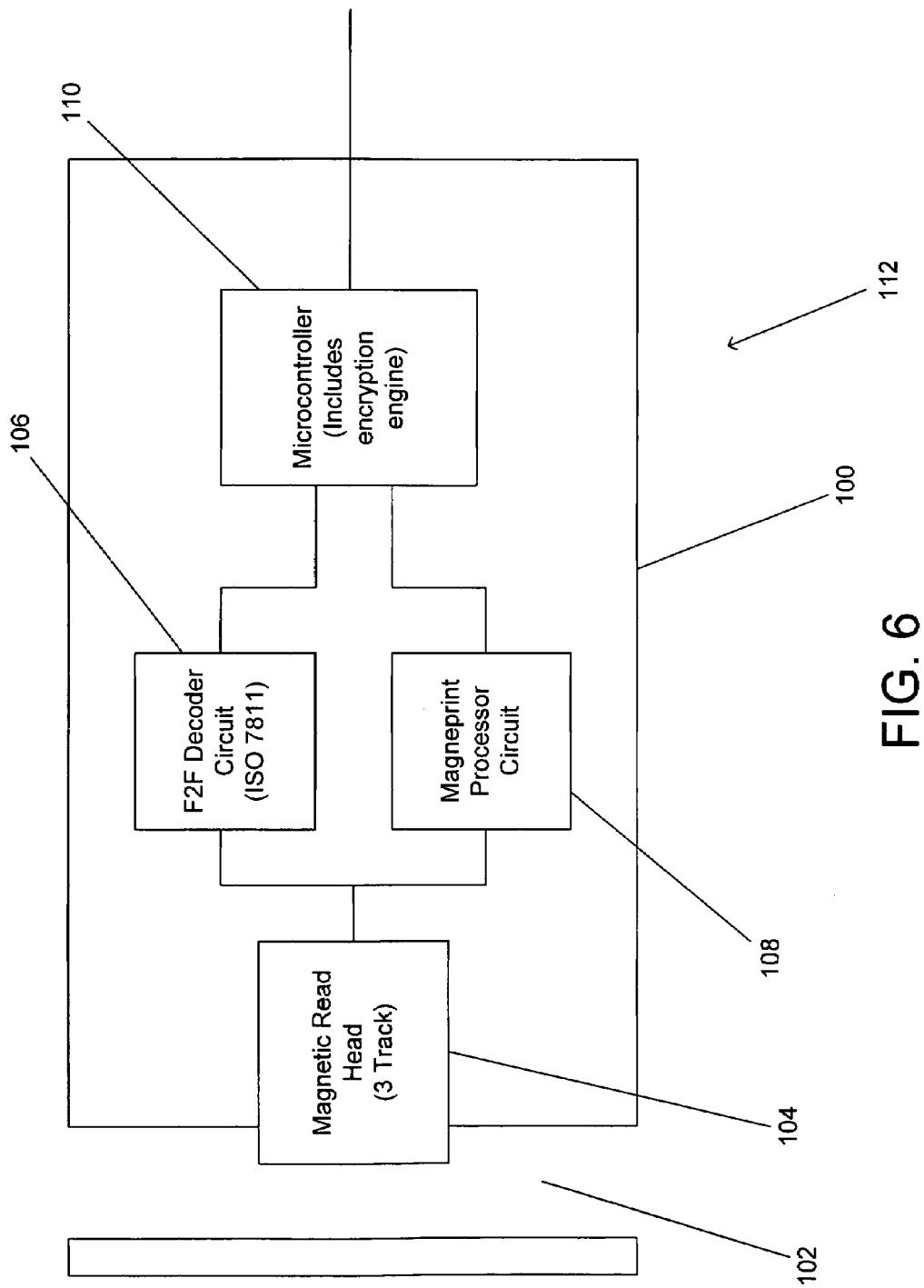
FIG. 6 is a schematic diagram of a magnetic stripe reader in accordance with an embodiment of the present invention.

An embodiment of a magnetic stripe reader in accordance with the present invention is shown in FIG. 6. The reader 112 includes a housing 100 in which a card path 102 is located. In the illustrated embodiment the card path is that of a swipe reader. In other embodiments, insertion readers, motorized card readers and other types of reader configurations can be used. A magnetic reading head 104 is located within the card path. In the illustrated embodiment, the magnetic reading head 104 is configured to read information recorded as three tracks on the magnetic stripe of a card complying with the ISO 7811 standard. The output of the magnetic reading head is provided to both a decoder circuit 106 and a circuit 108 configured to extract a magnetic fingerprint from the output signal. The decoder circuit 106 extracts digital data recorded as tracks on the magnetic stripe. The circuit 108 derives specific information from the output signal of the magnetic reading head that constitutes the magnetic fingerprint of the magnetic stripe. The data extracted by the decoder circuit 106 and the magnetic fingerprint extracted by the circuit 108 are provided to a microcontroller. The microcontroller can include an encryption engine that selectively encrypts portions of the data and magnetic fingerprint received by the microcontroller. As discussed above, the microcontroller can implement one of any number of encryption standards. Once the selected information is encrypted, then the unencrypted and encrypted information along with additional information such as a serial number for the reader (encrypted or unencrypted) can be forwarded to a terminal in the manner described above.

In addition to the embodiment shown in FIG. 6, many different configurations of circuits and circuit components can be combined to obtain a signal indicative of the magnetic field of a magnetic stripe and to extract data signals and information that can be used to uniquely identify the magnetic stripe from which the signal was obtained. In addition, many different varieties of circuits and components can be used to encrypt the information and format the unencrypted and encrypted information for provision to a terminal. Once the information is received by the terminal, the information can be reformatted and additional information appended by the terminal prior to transmission to a server via a network. As indicated above, the server can be configured in any variety of ways including possessing the circuitry necessary to coordinate the encryption scheme used by the network.

In the embodiment shown in FIG. 6, the components of the magnetic stripe reader are contained within a housing. In a number of embodiments, the housing is constructed in a way that is tamper resistant. In many embodiments, the magnetic reader is constructed so that an attempt to tamper with the reader will result in the erasure of some or all of the information contained within the encryption engine of the microcontroller. In many embodiments, information is erased and the microcontroller enters a tamper mode. In the tamper mode, the microcontroller can only perform functions associated with diagnosing the attempt to tamper with the magnetic stripe reader. In numerous embodiments, attempts to detect tampering with the reader are detected using a security enclosure. Examples of security enclosures include a matrix of conductive ink traces, such as the Tamper Respondent Surface Enclosure manufactured by W. L. Gore and Associates of Elkton, Md. In several embodiments, the security enclosure can detect heat, electricity or other forms of tampering.

In the discussion above, the authentication of information provided by a document bearing a magnetic stripe is discussed. In a number of embodiments, the information on a document can be supplemented with information entered via a keyboard or other input device. If the input device is not secured, then the input from the input device can be intercepted. Magnetic card readers in accordance with several embodiments of the invention attempt to frustrate efforts to intercept data entered by input devices that provide unencrypted outputs. The unencrypted input devices are connected to the magnetic card readers and the magnetic card readers are connected to the terminal such that the magnetic card readers are located between the unencrypted input devices and the terminal. The magnetic card reader passes information unencrypted, unless the terminal and/or the input device indicate that the information is intended to remain secure. In the event that the information is intended to remain secure, the information is encrypted by the magnetic card reader before transmission to the terminal. By physically disconnecting the input device from the terminal, the magnetic card reader creates a hardware firewall between the input device and the terminal.

Figure 7:
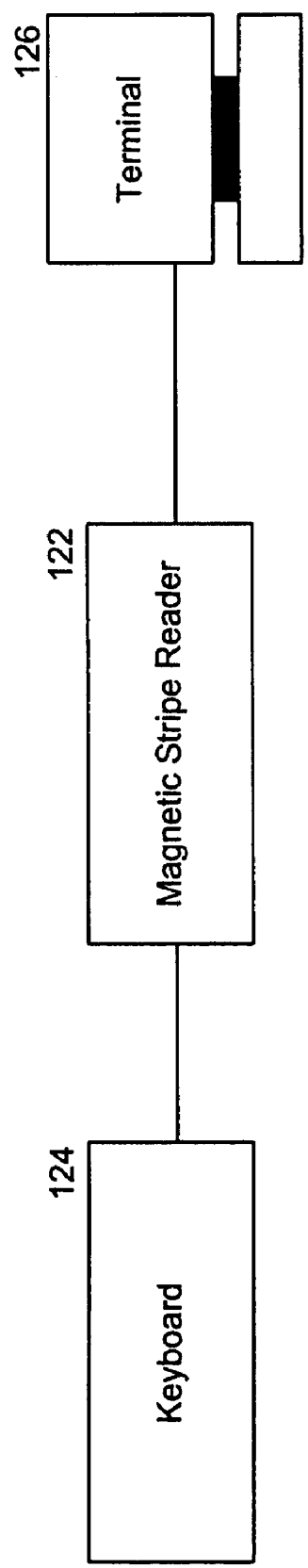
FIG. 7 is a schematic diagram of a magnetic stripe reader connected between a keyboard and a computer in accordance with an embodiment of the invention.

An embodiment of a magnetic card reader connected between a keyboard and a personal computer in accordance with an embodiment of the invention is shown in FIG. 7. The magnetic card reader 122 is connected via a USB connection to a keyboard 124 and via a USB connection to the terminal/personal computer 126. In the illustrated embodiment, the magnetic card reader 122 can act to interrupt the physical connection between the keyboard and the personal computer.

Although a keyboard is illustrated, any of a variety of devices that produce an unencrypted output can be combined with an appropriately configured magnetic stripe reader in accordance with the present invention. Moreover, the magnetic stripe reader can be connected between an input device and any of a variety of terminals. Although USB connections are illustrated, any appropriate communication protocols can be used to connect the input device to the terminal. In a number of embodiments, the protocols used to connect the magnetic stripe reader to the input device are the same as those used to connect the magnetic stripe reader and the terminal. In other embodiments, the system is designed to include the magnetic stripe reader and different protocols can be used for the communications between the input device and the magnetic stripe reader and the communications between the magnetic stripe reader and the terminal.

In several embodiments, a magnetic stripe card reader can be used to authenticate a remote server/website and to establish a secure connection with the authenticated server/website. In a number of embodiments, the magnetic stripe card reader can engage in a mutual authentication protocol with the website that allows the magnetic stripe card reader to verify that the website is authentic and allows the website to verify the authenticity of the magnetic stripe card reader. When the magnetic stripe card reader and website have verified mutual authenticity, the magnetic stripe card reader can notify the user of the magnetic stripe card reader using an indicator associated with the magnetic stripe card reader. In one embodiment, the website and/or terminal can notify the user of the authentication of the magnetic stripe card reader via the terminal.

Figure 8:
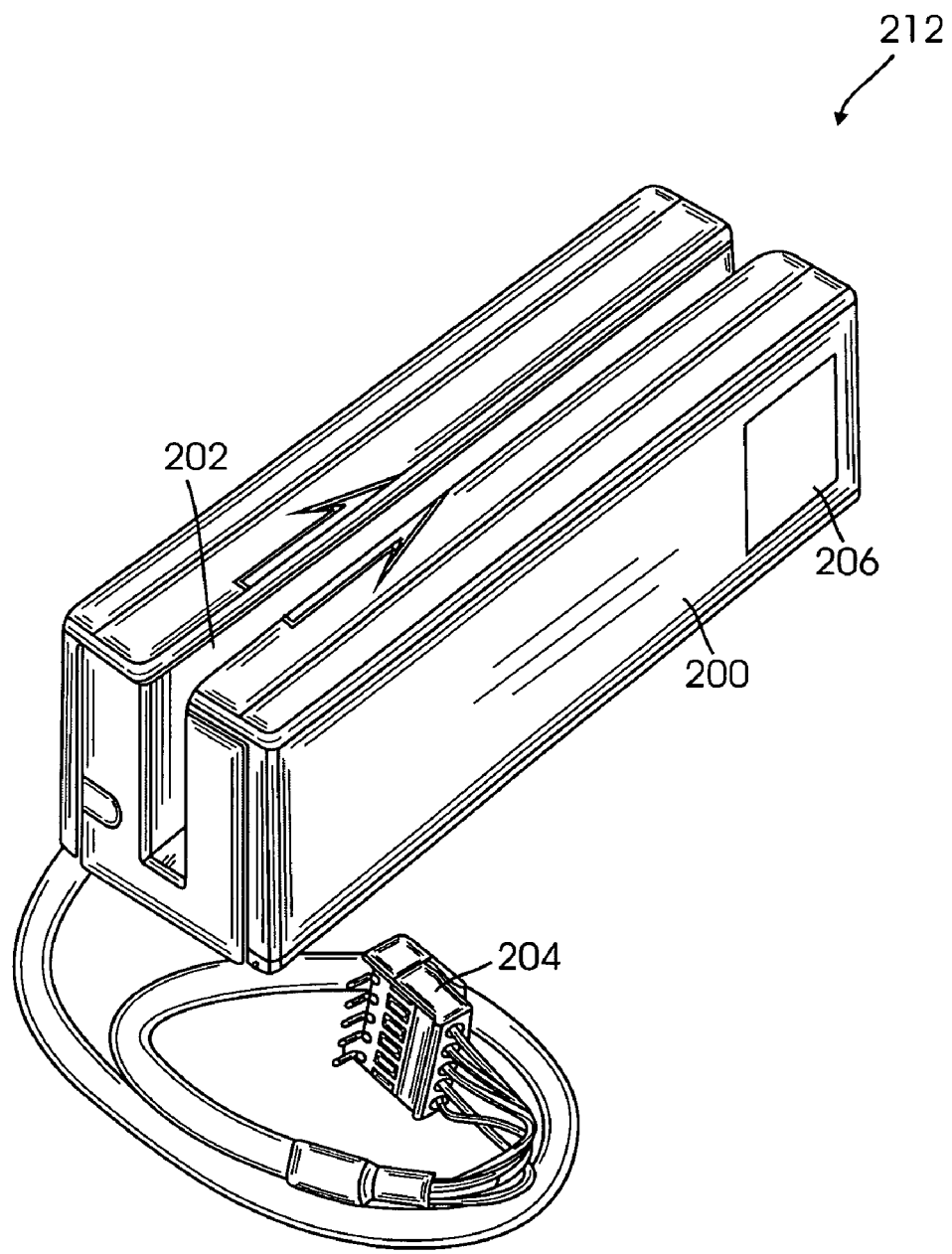
FIG. 8 is a perspective view of a magnetic stripe card reader having an indicator in accordance with an embodiment of the invention.

A perspective view of a magnetic stripe card reader having an indicator in accordance with an embodiment of the invention is illustrated in FIG. 8. The magnetic stripe card reader 212 includes a housing 200, a card path 202, a input/output interface 204, an indicator 206, a magnetic read head (not shown) and a microcontroller (not shown). The housing 200 forms the card path 202 which is configured to receive a data card (not shown) having a magnetic stripe. The microcontroller is connected to the input/output interface 204, the indicator 206, and the magnetic read head. The connection from the microcontroller to the magnetic read head can be direct or via additional circuits as indicated in FIG. 6.

In one embodiment, the components of the magnetic stripe card reader can further include any of the components indicated FIG. 6. In such case, the components of the magnetic stripe reader can be connected as indicated in FIG. 6.

In operation, a data card (not shown) can be swiped through the card path 202 and the magnetic read head (not shown) can obtain information from the magnetic stripe of the data card. Information read from the data card can be at least partially encrypted or left at least partially unencrypted and sent to terminal (see 14 of FIG. 1) via the input/output interface as described above.

The magnetic stripe card reader 212 can be connected to the terminal 14 of FIG. 1 in a number of ways. In one embodiment, the magnetic stripe card reader 212 is connected to the terminal 14 using USB. In other embodiments, the magnetic stripe card reader 212 is connected to the terminal 14 using RS 232, RS 422, RS 485, EIA 530, Ethernet, USB or another physical layer protocol for connecting communications equipment. In other embodiments, other protocols and physical mediums can be used to connect the magnetic stripe card reader and the terminal. In several embodiments, the magnetic stripe card reader can use proprietary communication methods to communicate with the terminal. In operation, the magnetic stripe card reader can communicate bidirectionally with the terminal. The bidirectional communication can be full duplex, half duplex or another appropriate protocol.

When the magnetic stripe card reader has established a secure connection with an authenticated website or server, the card reader can notify the user of the card reader using the indicator 206. In one embodiment, the indicator is a light emitting diode (LED) or any other device capable of attracting the attention of the user of the card reader. In one embodiment, the indicator is an audible indicator such as a bell or other sound. In another embodiment, the indicator is a tactile indicator such as a buzzer, vibrating mechanism or other tactile device. In another embodiment, the indicator is implemented using some combination of a visual, audible and/or tactile indicator. In several embodiments, the card reader notifies the terminal that a secure and authenticated connection with the website was established using a predetermined protocol for communication between the card reader and the terminal. In several embodiments, the website also provides a message indicating that a secure connection with an authenticated reader has been established. The website can further instruct the user to verify that the indicator on the card reader indicates that a secure connection has been established. For example, the website could state "Please verify that your intelligent card reader has its green LED flashing", or something to that effect.

Figure 9:
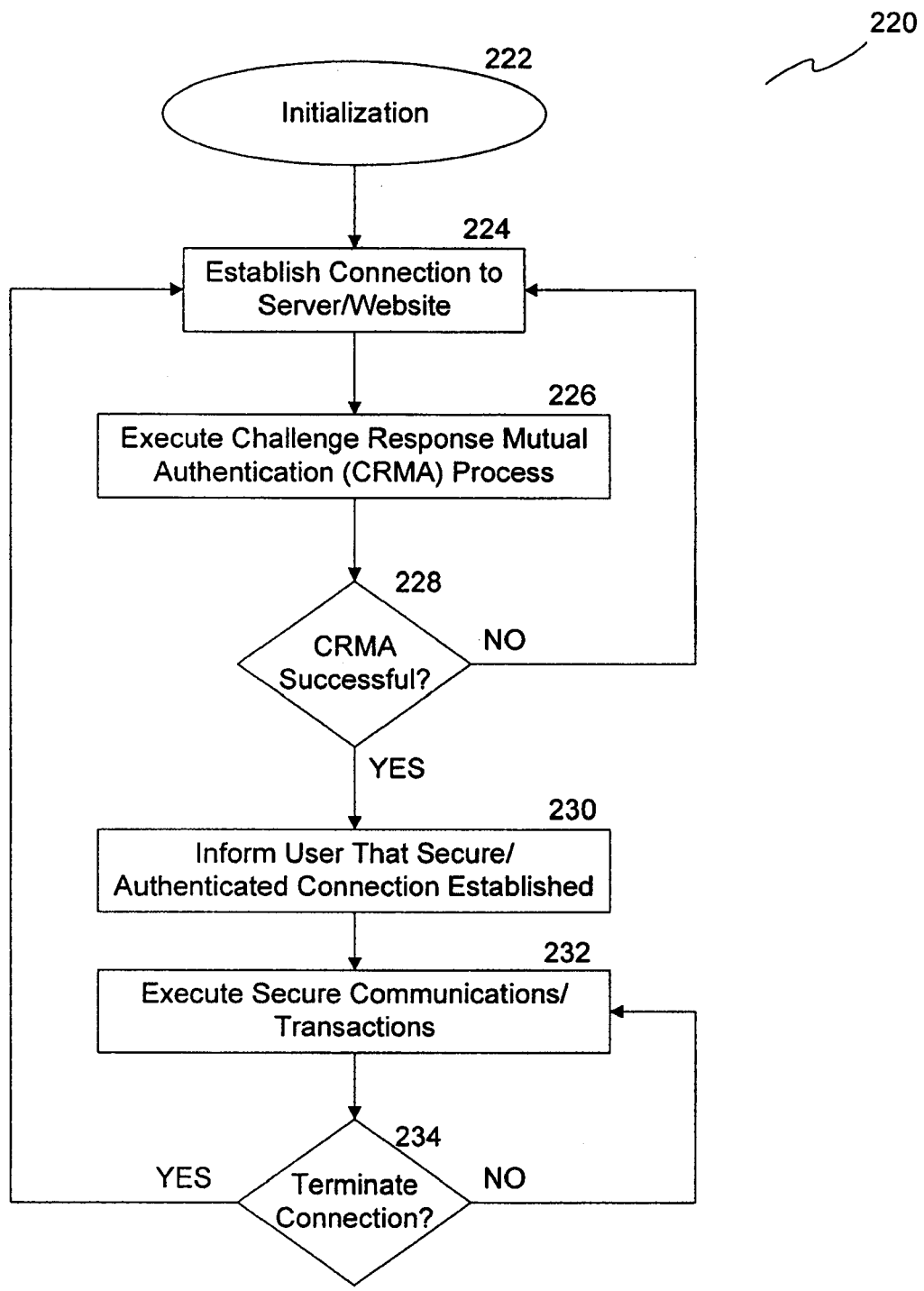
FIG. 9 is a flow chart of a process for establishing an authenticated connection between a server and a magnetic stripe card reader in accordance with an embodiment of the invention.

A flow chart of a process for establishing an authenticated connection between a server and a magnetic stripe card reader in accordance with an embodiment of the invention is illustrated in FIG. 9. The process 220 begins with the initialization 222 of the card reader and any authentic websites for a mutual authentication process. In some embodiments, the initialization includes initializing the card reader and any authentic websites with one or more common security keys. In such embodiments, manufacturers of card readers and website providers have often established common security keys that are kept secret. The process then continues when the user of the card reader establishes (224) a connection to a website or other remote server. The card reader and website then execute (226) a mutual authentication process. In the illustrated embodiment, the card reader and website execute a challenge response mutual authentication process. If the mutual authentication process is not successful (228), then the process returns to allowing the user to establish (224) a connection to a website. If the mutual authentication process is successful (228), then the process informs (230) the user that a secure connection with an authentic website has been established. Once the connection is established, the user and/or card reader can execute (232) secure communications and/or transactions. The process can then determine whether the card reader and/or website wishes to terminate (234) the connection. If neither the card reader or website desires to terminate the connection, then the process can execute (230) additional secured communications and/or transactions. If either the website or card reader desires to terminate the connection, then the process can return to waiting for the user to establish (224) a new connection to a server or website.

In several embodiments, the user is informed (230) using an indicator associated with the magnetic stripe card reader. In some embodiments, the user is informed by a message on the terminal. In some embodiments, the user is informed using both the indicator and one or more messages on the terminal. In one embodiment, the user is instructed to check the indicator by a message on the terminal. Visual cues from the reader and website can thus instruct the user of a secure connection with an authentic website. Phishing and other consumer deception schemes can thus be prevented.

In one embodiment, secure transactions that can be established and protected also include transactions relating to non-financial websites that require confidential information such as a driver's license number, a date of birth, a social security number, medical information or other confidential information. In such secure transactions, the card reader can act in essence like a security feedback system that is transparent to the user.

Figure 10:
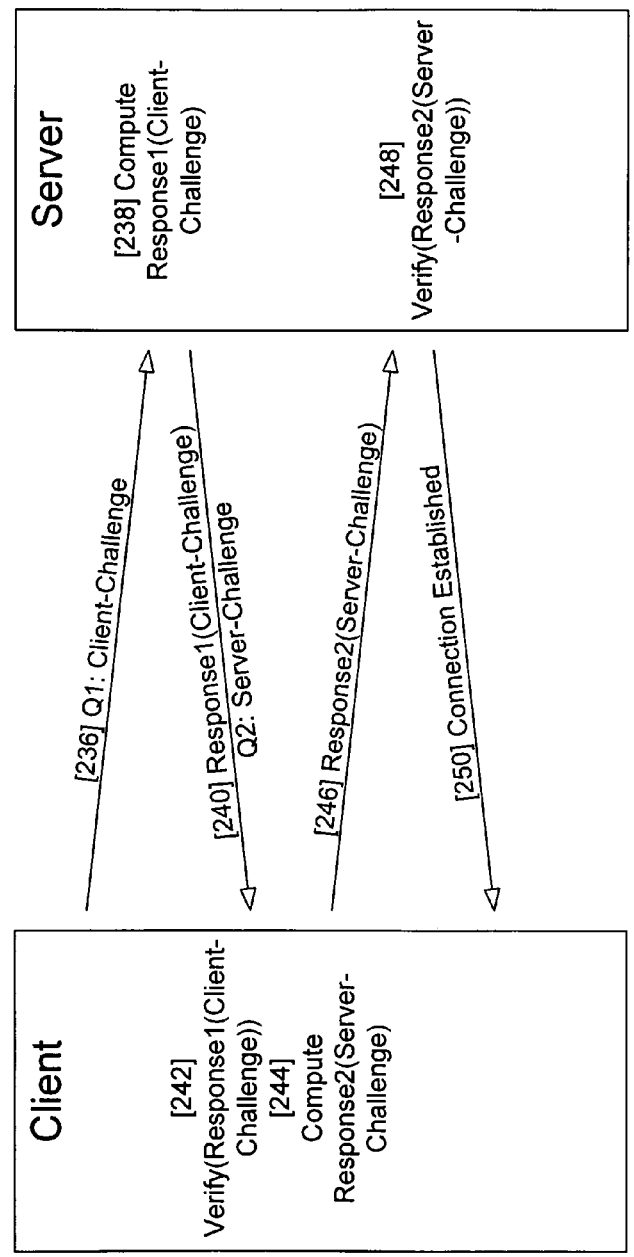
FIG. 10 is a block diagram/flow chart of a process for implementing challenge-response mutual authentication between a client and a server in accordance with an embodiment of the invention.

A block diagram/flow chart of a process for implementing challenge-response mutual authentication (CRMA) between a client and a server in accordance with an embodiment of the invention is illustrated in FIG. 10. The process 226 begins when the client sends (236) a challenge question (Q1: Client-Challenge) to the server. The server computes (238) a response (Response1(Client-Challenge)) to the client's challenge question and the server creates a challenge question (Q2: Server-Challenge). In one embodiment, the server's response is a function of a secret key known to both the client and the server, the client challenge question (Q1) and the server challenge question (Q2). In other embodiments, additional parameters for computing the server's response can include a counter, session information and/or a timestamp. The server then sends (240) the response (Response1(Client-Challenge)) and the server's challenge question (Q2: Server-Challenge). The client then verifies (242) that the server has validly responded (Verify(Response1(Client-Challenge))). If so, the client then computes (244) a response to the server's challenge question (Response 2(Server-Challenge)) and sends (246) the response to the server. In one embodiment, the client's response is a function of a secret key known to both the client and the server, the client challenge question (Q1) and the server challenge question (Q2). In other embodiments, additional parameters for computing the client's response can include a counter, session information and/or a timestamp. The server verifies (248) that the client has validly responded to the server's challenge question (Verify(Response2(Server-Challenge))). If the response was valid, the server sends (250) a connection established message or the equivalent.

In other embodiments, other methods of executing a challenge response mutual authentication process can be used. In one embodiment, a Kerberos challenge response method is used. In some embodiments, challenge response mutual authentication may be implemented using symmetric encryption, one way functions, public key encryption and/or digital signatures. In another embodiment, any method of implementing a challenge response mutual authentication process known to one skilled in the art may be used to establish a secure and authenticated connection between the client and the server. In several embodiments, the card reader is the client and a website is the server for the CRMA process. In other embodiments, other methods of achieving mutual authentication can be used instead of CRMA.

Figure 11:
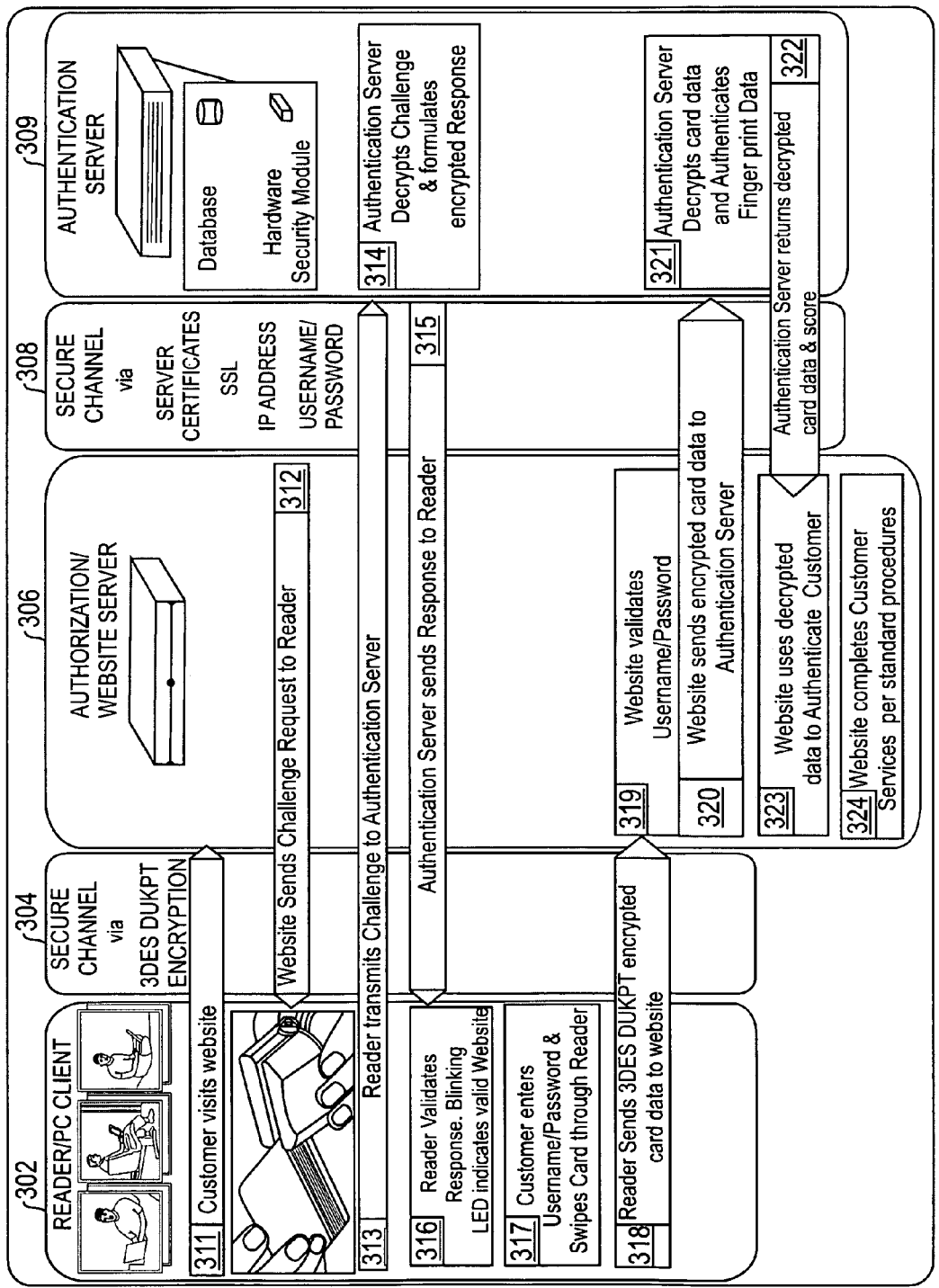
FIG. 11 is a functional block diagram/flow chart of a challenge-response mutual authentication process that can be performed between a client and a server in accordance with an embodiment of the invention.

FIG. 11 is a functional block diagram/flow chart of a challenge-response mutual authentication process that can be performed between a client and a server in accordance with an embodiment of the invention. The system includes a data card reader/PC client 302 coupled by a secure channel 304 to a authorization/website server 306. The website server 306 is coupled by another secure channel 308 to an authentication server 309. The secure channel 304 can use triple DES DUKPT encryption techniques to secure the channel. In other embodiments, other methods of encryption can be used to secure the channel 304. The secure channel 308 can use any combination of server certificates, secure sockets layer (SSL), and/or internet protocol (IP) addresses to secure the channel.

The process can begin when a customer using the reader/PC client visits (311) the website of the website server. The website can respond by sending (312) a challenge request to the reader. In a number of embodiments, the reader can respond to the challenge request issued by the website by sending the challenge request back to the website in an encrypted form using a common encryption key. The reader then transmits (313) a challenge to the authentication server. The authentication server decrypts (314) the reader's challenge and formulates an encrypted response. The authentication server then sends (315) the formulated response to the reader. The reader validates (316) the response. A blinking LED on the reader can indicate a valid website. The customer enters (317) the customer's username/password and swipes the data card through the reader. The reader sends (318) triple DES (3DES) DUKPT encrypted card data to the website. The website validates (319) the customer's username/password. The website then sends (320) the encrypted card data to the authentication server. The authentication server decrypts (321) the card data including magnetic fingerprint data and authenticates the magnetic fingerprint data. The authentication server then returns (322), to the website, the decrypted card data and a score indicative of the degree of correlation between the magnetic fingerprint data read from the data card during the transaction and a stored value. The website uses (323) the decrypted data to authenticate the customer and/or customer transaction. The website can then complete (324) the services requested by the customer using standard procedures.

In one embodiment, the process can perform the sequence of actions depicted in FIG. 11 in any order. In another embodiment, the process can skip one or more of the actions. In other embodiments, one of more of the actions are performed simultaneously.

In several embodiments, the username can be an identifier intended for one time use. In such case, the identifier can include the magnetic fingerprint of the data card engaged in the current transaction. In one embodiment, the password can be a value intended for one time use. In such case, the password value can include the magnetic fingerprint of the data card engaged in the current transaction. In another embodiment, the username, password and magnetic fingerprint of the data card engaged in the current transaction can be combined to form a digital signature intended for one time use.

In one embodiment, the reader is configured to output encrypted data including card track data, magnetic fingerprint data, sequence counter data and cyclic redundancy check (CRC) data. In another embodiment, the reader is configured to output unencrypted or clear text data including key serial number data, DUKPT counter data, masked data, CRC data, and reader serial number data.

In another embodiment, the authentication server is also the transaction terminal. In such case, authentication of a card can take place at the transaction terminal. In this example of localized authentication, the card authentication information including the intrinsic magnetic characteristics of the data card can be stored in an encoded form (stored reference fingerprint) on the data card. The transaction terminal can receive the intrinsic magnetic characteristic of the card (transaction fingerprint) and stored information including the stored reference fingerprint from the card reader. Using this information, the terminal can perform the scoring process at the terminal. A score indicative of the degree of correlation of the fingerprint read from the card and the stored fingerprint can be generated. Based on the score, the terminal can determine whether or not the card is authentic.

In another embodiment, the data card reader includes a remote key loading feature which enables a remote server or other computing device to load an encryption key onto the reader. In one embodiment, the authentication system, including the authentication server and/or the trusted scoring system, can enable remote key loading. In one such case, a data card reader can include a secure mode for securely loading encryption keys. Special information provided to the reader can cause the reader to enter the secure mode. In another embodiment, the data card reader can include multiple levels of security. In such case, each level can correspond to a different degree of security and a level of encryption used. In one embodiment, the highest level of security can require that all data received and sent by the reader is encrypted. In one embodiment, a remote computing device can use an existing encryption key, one that is generally used for encrypting data read by the data card reader, in conjunction with a security sequence to enter the secure mode and remotely load one or more encryption keys. In another embodiment, the remote computing device can use a special manufacturing encryption key in conjunction with a security sequence to enter the secure mode and remotely load one or more encryption keys. In such case, the remotely loaded keys can replace the existing encryption keys. In several embodiments, the encryption keys used are DUKPT encryption keys. In some embodiments, the manufacturing key can be known only by the card reader itself and the manufacturer of the reader.

In a number of embodiments, the data card reader is equipped with a means of providing audio, visual or tactile feedback to the user. In a number of embodiments, the feedback can relate to whether the card reader has been authenticated and/or whether a swiped data card has been authenticated. In a number of embodiments, the visual feedback can be conveyed using one or more LEDs. In one embodiment, the audio feedback is conveyed using a speaker.

In many embodiments including the embodiment of FIG. 1, another computing device (not shown) or third party can be involved in communications with a magnetic stripe card reader 12. The third party computing device can be in communication with the server 16. The server/website can query the third party for data card related transactions or information. The third party can retain a database having authentication information, identification information and/or records related to the user of a data card. Communications with both the third party and server 16 can be encrypted in whole or in part. A number of such embodiments are described in U.S. patent application Ser. No. 11/935,980, entitled "CARD AUTHENTICATION SYSTEM", which is hereby incorporated by reference in its entirety.

Figure 12:
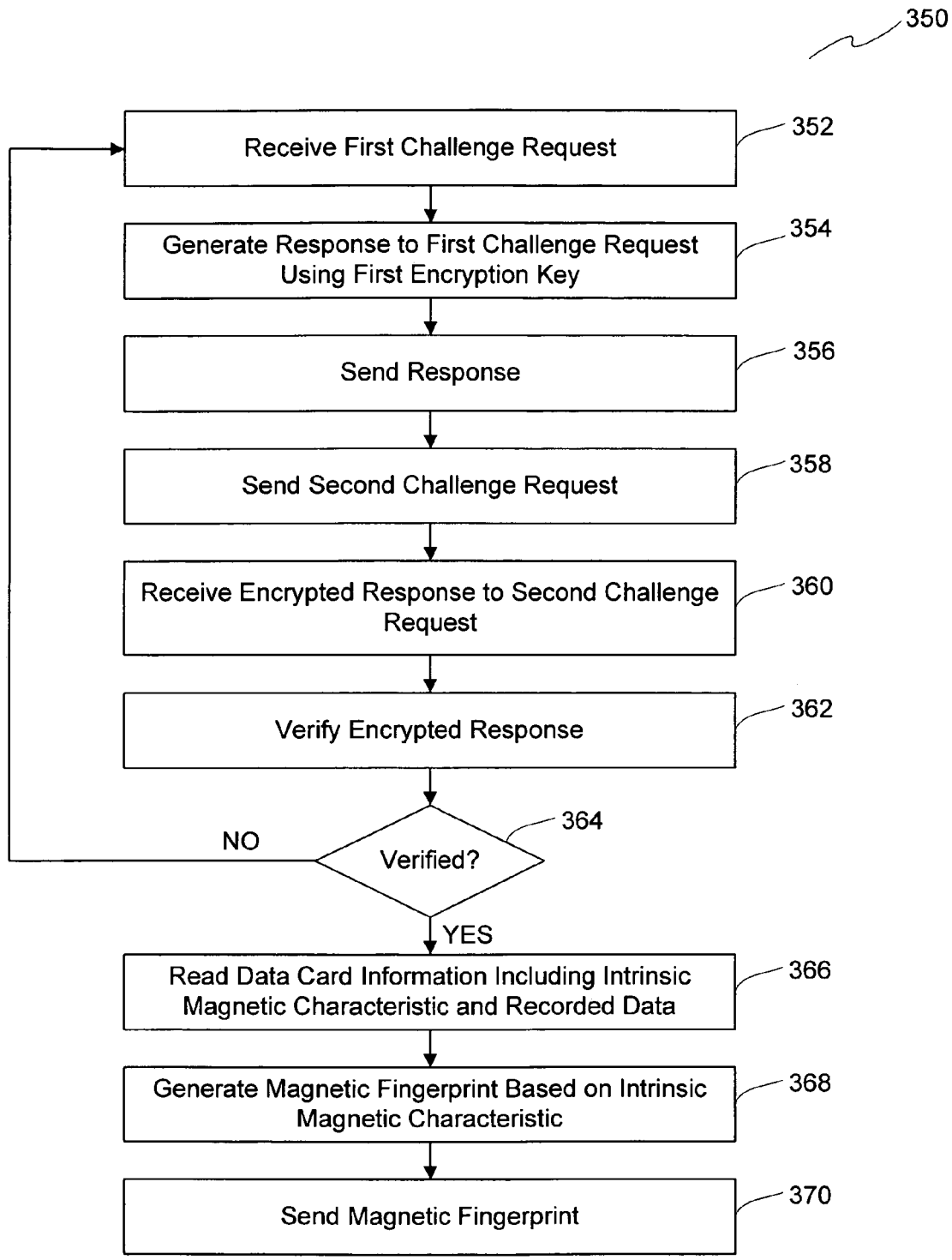
FIG. 12 is a flow chart illustrating a challenge-response mutual authentication process that can be performed by a client/card reader in accordance with an embodiment of the invention.

FIG. 12 is a flow chart illustrating a challenge-response mutual authentication process that can be performed by a client/card reader in accordance with an embodiment of the invention. The process begins by receiving (352) a first challenge response. The process generates (354) a response to the first challenge using a first encryption key. The process sends (356) the response. The process sends (358) a second challenge request. The process receives (360) an encrypted response to the second challenge request. The process verifies (362) the encrypted response. If the encrypted response is not verified, the process returns to receiving (352) a first challenge request. If the encrypted response is verified, then the process reads (366) data card information including an intrinsic magnetic characteristic and recorded data from a data card when a user of the reader swipes the data card. The process generates (368) a magnetic fingerprint based on the intrinsic magnetic characteristic. The process sends (370) the magnetic fingerprint.

In a number of embodiments, the reader process exchanges information involved in the mutual authentication process with a website server and/or an authentication server. In one embodiment, the process can perform the sequence of actions depicted in FIG. 12 in any order. In another embodiment, the process can skip one or more of the actions. In other embodiments, one of more of the actions are performed simultaneously. In some embodiments, the actions performed in FIG. 12 are performed using both a reader and a terminal.

In one embodiment, the card reader can include a read head having a housing enclosing a number of components generally found in the card reader. Embodiments of such read heads are described in U.S. patent application Ser. No. 11/949,722, entitled "ENCRYPTING THE OUTPUT OF A CARD READER IN A CARD AUTHENTICATION SYSTEM", which is hereby incorporated by reference in its entirety.

Figure 13:
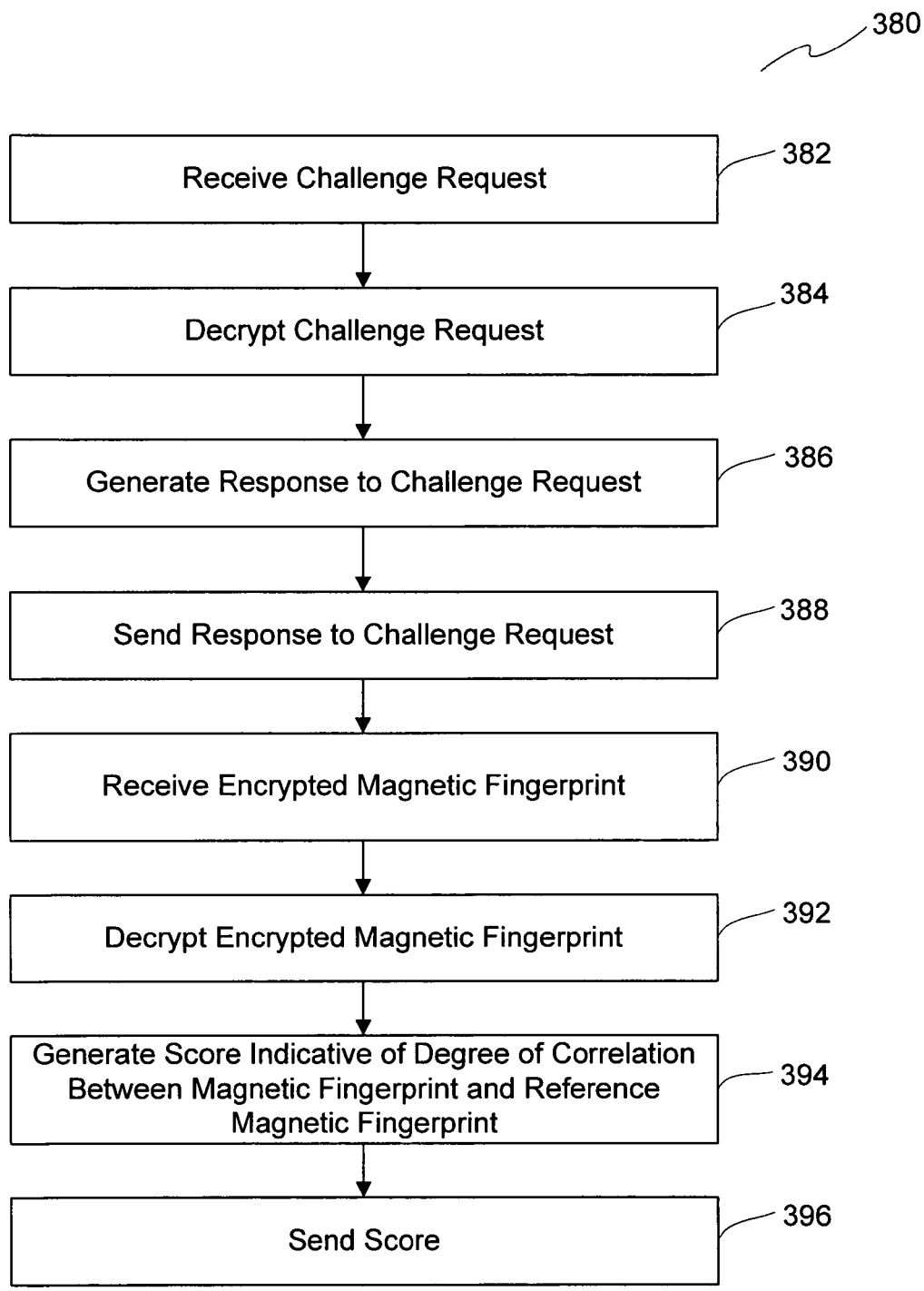
FIG. 13 is a flow chart illustrating a challenge-response mutual authentication process that can be performed by a server in accordance with an embodiment of the invention.

FIG. 13 is a flow chart illustrating a challenge-response mutual authentication process 380 that can be performed by a server in accordance with an embodiment of the invention. The process receives (382) a challenge request. The process decrypts (384) the challenge request. The process generates (386) a response to the challenge request. The process sends (388) the response to the challenge request. The process can receive (390) an encrypted magnetic fingerprint (390). The process decrypts (392) the encrypted magnetic fingerprint. The process generates (394) a score indicative of a degree of correlation between the magnetic fingerprint and a stored reference magnetic fingerprint. The stored reference magnetic fingerprint can be a fingerprint value known to be associated with an authentic data card. The process sends (396) the score.

In a number of embodiments, the server process exchanges information involved in the mutual authentication process with a card reader and/or a website server. In one embodiment, the process can perform the sequence of actions depicted in FIG. 13 in any order. In another embodiment, the process can skip one or more of the actions. In other embodiments, one of more of the actions are performed simultaneously.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method for establishing a secure connection between a card reader and a server, the method comprising:
    receiving, at the card reader, a first challenge request;
    generating, at the card reader, a response to the first challenge request using a first encryption key;
    sending, from the card reader, the response to the first challenge request;
    sending, from the card reader, a second challenge request to the server;
    receiving, at the card reader, an encrypted response to the second challenge request;
    verifying, at the card reader, the encrypted response to the second challenge request; and
    if the encrypted response is verified:
        reading data card information from a data card, the data card information comprising an intrinsic magnetic characteristic and recorded data on the data card;
        generating, at the card reader, a magnetic fingerprint based on the intrinsic magnetic characteristic; and
        sending, from the card reader, the magnetic fingerprint to authenticate the data card.

2. The method of claim 1, further comprising:
    generating, at the server, the first challenge request;
    sending, from the server, the first challenge request;
    receiving, at the server, the response to the first challenge request;
    verifying, at the server, the response to the first challenge request using the first encryption key; and
    if the response to the first challenge request is verified:
        receiving, at the server, the second challenge request;
        generating, at the server, the response to the second challenge request using a second encryption key; and
        sending, from the server, the response to the second challenge request.

3. The method of claim 2, further comprising:
    if the response to the second challenge is verified:
        receiving, at the server, the magnetic fingerprint;
        generating, at the server, a score indicative of a degree of correlation between the magnetic fingerprint and a reference magnetic fingerprint; and
        determining, at the server, the authenticity of the data card based upon the score.

4. The method of claim 1, further comprising:
    generating, at a website server, the first challenge request;
    sending, at the website server, the first challenge request;
    receiving, at the website server, the response to the first challenge request;
    verifying, at the website server, the response to the first challenge request using the first encryption key; and
    if the response to the first challenge request is verified:
        receiving, at an authentication server, the second challenge request;
        generating, at the authentication server, the response to the second challenge request using a second encryption key; and
        sending, at the authentication server, the response to the second challenge request.

5. The method of claim 4, further comprising:
    if the response to the first challenge request is verified:
        receiving, at the authentication server, the magnetic fingerprint;
        generating, at the authentication server, a score indicative of a degree of correlation between the magnetic fingerprint and a reference magnetic fingerprint; and
        determining, at the website server, the authenticity of the data card based upon the score.

6. The method of claim 4, further comprising:
    if the response to the first challenge request is verified:
        receiving, at the authentication server, the magnetic fingerprint;
        generating, at the authentication server, a score indicative of a degree of correlation between the magnetic fingerprint and a reference magnetic fingerprint; and
        determining, at the card reader, the authenticity of the data card based upon the score.

7. The method of claim 1:
    wherein the generation of the response to the first challenge request using the first encryption key comprises encrypting the first challenge request using the first encryption key;
    wherein the verification of the encrypted response to the second challenge request comprises:
        decrypting the encrypted response to the second challenge request using a second encryption key; and
        comparing the decrypted response to the second challenge request with the second challenge request.

8. The method of claim 1, further comprising:
    if the encrypted response is verified:
        encrypting at least a portion of the recorded data;
        encrypting the magnetic fingerprint;
        receiving data associated with a data card transaction;
        encrypting at least a portion of the transaction data;
        sending the encrypted portion of the recorded data; and
        sending the transaction data;
    wherein the sending the magnetic fingerprint to authenticate the data card comprises sending the encrypted magnetic fingerprint.

9. The method of claim 8, further comprising:
    masking a portion of the recorded data where at least one masking character is determined using a "mod 10" algorithm; and
    sending the masked portion and an unmasked portion of the recorded data.

10. The method of claim 8, further comprising:
    receiving a score indicative of a degree of correlation between the magnetic fingerprint and a reference magnetic fingerprint; and
    determining the authenticity of the data card based upon the score.

11. The method of claim 8, wherein the card reader comprises a point of sale terminal and a magnetic stripe card reader.

12. The method of claim 1, wherein the card reader comprises a sensor at least partially enclosed within a housing, the sensor coupled to a processor, the processor located within the housing, for:
    receiving the first challenge request;
    generating the response to the first challenge request using the first encryption key;
    sending the response to the first challenge request;
    sending the second challenge request;

receiving the encrypted response to the second challenge request;
verifying the encrypted response to the second challenge request; and
if the encrypted response is verified:
reading the data card information from the data card, the data card information comprising an intrinsic magnetic characteristic and recorded data on the data card;
generating the magnetic fingerprint based on the intrinsic magnetic characteristic; and
sending the magnetic fingerprint to authenticate the data card.

13. The method of claim 1, further comprising, if the response to the second challenge is verified, providing an indicator indicative of verification of the response to the second challenge.

14. The method of claim 13, wherein the indicator is any of a light emitting diode, a sound generator and a tactile device.

15. The method of claim 1, wherein the intrinsic magnetic characteristic is a remanent noise characteristic.

16. The method of claim 1, further comprising:
receiving input from an input device;
transmitting information indicative of the input received from the input device;
receiving an instruction to encrypt the information received from the input device; and
transmitting information indicative of the encrypted information.

17. The method of claim 1, further comprising enabling encryption key loading from a remote device.

18. The method of claim 17, wherein the enabling encryption key loading from a remote device comprises using a manufacturing encryption key known to both the card reader and the remote device to load at least one encryption key.

19. The method of claim 1, wherein the server comprises a website server and an authentication server.

20. A system for establishing a secure connection between a card reader and a server, the system comprising:
the card reader comprising:
a read head configured to read data card information from a data card, the data card information comprising an intrinsic magnetic characteristic and recorded data on the data card; and
a processor coupled to the read head, the processor configured to:
receive a first challenge request;
generate a response to the first challenge request using a first encryption key;
send the response to the first challenge request;
send a second challenge request;
receive an encrypted response to the second challenge request;
verify the encrypted response to the second challenge request;
generate, if the encrypted response is verified, a magnetic fingerprint based on the intrinsic magnetic characteristic; and
send the magnetic fingerprint.

21. The system of claim 20, further comprising:
a website server configured to:
generate the first challenge request;
send the first challenge request to the card reader;
receive the response to the first challenge request; and
verify the response to the first challenge request using the first encryption key; and an authentication server configured to:
receive the second challenge request from the card reader;
generate the response to the second challenge request using a second encryption key; and
send the response to the second challenge request.

22. The system of claim 21, wherein the authentication server is further configured to:
receive the magnetic fingerprint; and
generate a score indicative of a degree of correlation between the magnetic fingerprint and a reference magnetic fingerprint.

23. The system of claim 22, wherein the website server is configured to determine an authenticity of the data card based upon the score.

24. The system of claim 22, wherein the card reader is configured to determine an authenticity of the data card based upon the score.

25. The system of claim 20, wherein the processor is further configured to:
encrypt the response to the first challenge request using the first encryption key;
decrypt the encrypted response to the second challenge request using a second encryption key; and
compare the decrypted response to the second challenge request with the second challenge request.

26. The system of claim 20, wherein the processor is further configure to:
encrypt at least a portion of the recorded data;
encrypt the magnetic fingerprint;
receive data associated with a data card transaction;
encrypt at least a portion of the transaction data;
send the encrypted at least a portion of the recorded data; and
send the transaction data.

27. The system of claim 26, wherein the processor is further configured to:
mask a portion of the recorded data where at least one masking character is determined using a "mod 10" algorithm; and
send the masked portion and an unmasked portion of the recorded data.

28. The system of claim 20:
wherein the read head includes a tamper resistant housing which, at least partially, encloses the read head; and
wherein the processor is located within the tamper resistant housing.

29. The system of claim 20, further comprising an indicator coupled to the processor, the indicator configured to indicate verification of the response to the second challenge.

30. The system of claim 29, wherein the indicator is any of a light emitting diode, a sound generator and a tactile device.

31. The system of claim 20, wherein the intrinsic magnetic characteristic is a remanent noise characteristic.

32. The system of claim 20, wherein card reader further comprises:
an input configured to receive information from an input device;
an input configured to receive instructions from an external device; and
an output configured to transmit information to the external device;
wherein the processor is configured to encrypt at least a portion of the information received from the input device and provide the encrypted information and at least a portion of any unencrypted information to the external device.

33. The system of claim 20, further comprising enabling encryption key loading from a remote device.

34. The system of claim 33, wherein the enabling encryption key loading from a remote device comprises using a manufacturing encryption key known to both the card reader and the remote device to load at least one encryption key.

35. A method for establishing a secure connection between a card reader and a server, the method comprising:

receiving, at the server, a challenge request generated by the card reader;

decrypting, at the server, the challenge request using a first encryption key;

generating, at the server, a response to the challenge request of the card reader using a second encryption key;

sending, from the server, the response to the challenge request;

receiving, at the server, an encrypted magnetic fingerprint;

decrypting, at the server, the encrypted magnetic fingerprint;

generating, at the server, a score indicative of a degree of correlation between the magnetic fingerprint and a reference magnetic fingerprint; and sending, from the server, the score.

36. The method of claim 35, wherein the server comprises a website server.

37. The method of claim 35, wherein the server comprises an authentication server.

38. The method of claim 35, wherein the server comprises a website server and an authentication server.

* * * * *